United States Patent [19]
Söderholm et al.

[11] Patent Number: 6,012,323
[45] Date of Patent: Jan. 11, 2000

[54] AUTOMATIC CALIBRATION CHECK ARRANGEMENT IN A MEASURING DEVICE

[75] Inventors: Arne Söderholm; Olle Söderholm, both of Bromma, Sweden

[73] Assignee: S.E.G. Mekanik AB, Amal, Sweden

[21] Appl. No.: 09/044,822

[22] Filed: Mar. 20, 1998

[30] Foreign Application Priority Data

Mar. 21, 1997 [EP] European Pat. Off. .............. 97850044

[51] Int. Cl.$^7$ ....................................................... G01F 1/00
[52] U.S. Cl. ............................................................ 73/1.16
[58] Field of Search .................................. 73/1.16, 1.27, 73/1.28

[56] References Cited

FOREIGN PATENT DOCUMENTS

| | | |
|---|---|---|
| 20 30 862 | 2/1972 | Germany . |
| 92/08958 | 5/1992 | WIPO . |

OTHER PUBLICATIONS

Medical and Biological Engineering And Computing, vol. 33, No.6, Nov. 1, 1995,pp. 835–837, Kranse et al "Linearisation of a Urinary Flow Transducer".

Patent Abstracts of Japan, vol. 096, No. 004, Apr. 30, 1996, JP 07–333017.

*Primary Examiner*—Robert Raevis
*Attorney, Agent, or Firm*—Pillsbury Madison & Sutro LLP

[57] ABSTRACT

A method for providing an automatic calibration check of a measuring device in which particles to be measured are subjected to tangential acceleration in a whirling impeller, and torque exerted on the vanes of the impeller in reaction to the Coriolis force of accelerated particles is measured as an indication of a mass flow rate, and wherein the flow of material is fed to the central part of the impeller and thereafter is by centrifugal force thrown towards the circumference of the impeller. Flow is measured by an electronic device which includes a microcomputer. When the flow is absent or constant the rotational speed of the impeller is varied, the moment change thereof is measured and an integrated value of the kinetic energy is used to verify the operation of the instrument.

7 Claims, 2 Drawing Sheets

AUTOMATIC CALIBRATION CHECK ARRANGEMENT IN A MEASURING DEVICE

BACKGROUND OF THE INVENTION

The present invention relates to an apparatus for measuring a mass flow, in particular bulk material or a fluid, and the invention especially relates to an automatic calibration arrangement used in a measuring device in which the mass flow rate is measured by using the Coriolis measuring principle. The arrangement according to the invention concerns both a method for automatic calibration and a device for implementing the method.

Such a prior measuring device is known from our copending European patent application No. 96850202.1, filed on Nov. 29, 1996, describing the main principles for such a mass flow meter, and to which application the interested reader is referred.

In such a measuring device, the particles to be measured are subjected to tangential acceleration in a whirling impeller, and the torque exerted on the vanes of the impeller in reaction to the Coriolis force of accelerated particles is being measured as an indication of the mass flow rate. The object of our above European patent application was to avoid measurement errors, due to uneven distribution of the material to be measured.

SUMMARY OF THE INVENTION

The object of the present invention is to provide a method and a device for performing an automatic verifying a calibration factor currently in use giving an alarm at malfunctions, or alternatively recalibrating the system by changing the calibration factor according to verified deviation from the check of such a mass flow measuring device.

The invention concerns a method and a device for using the change of the accumulated kinetic energy in the impeller and the other rotating parts for verifying, or alternatively recalibrating, the equipment. As the rotating parts have a constant weight and consequently a constant accumulated kinetic energy at a given rotational speed, a change in the speed between two known values constitutes an unambiguous measurement of the change in energy. For the relation between the moment M as measured and the change in speed applies that $M = J \times dn/dt$, wherein J is the measured moment of inertia for the rotating parts, dn is the change of rotational speed and dt is the period of time. The time integral gives the corresponding kinetic energy $A = J \times n^2/2$. With the help of these equations the change of energy can be calculated and the rotational parts can be given a value, corresponding to a flow of material. The value will then give a point of reference, corresponding to this material flow.

BRIEF DESCRIPTION OF THE DRAWINGS

The invention will now be described in the form of a non-limiting embodiment, shown on the enclosed drawings, in which.

DETAILED DESCRIPTION

Figure 1:
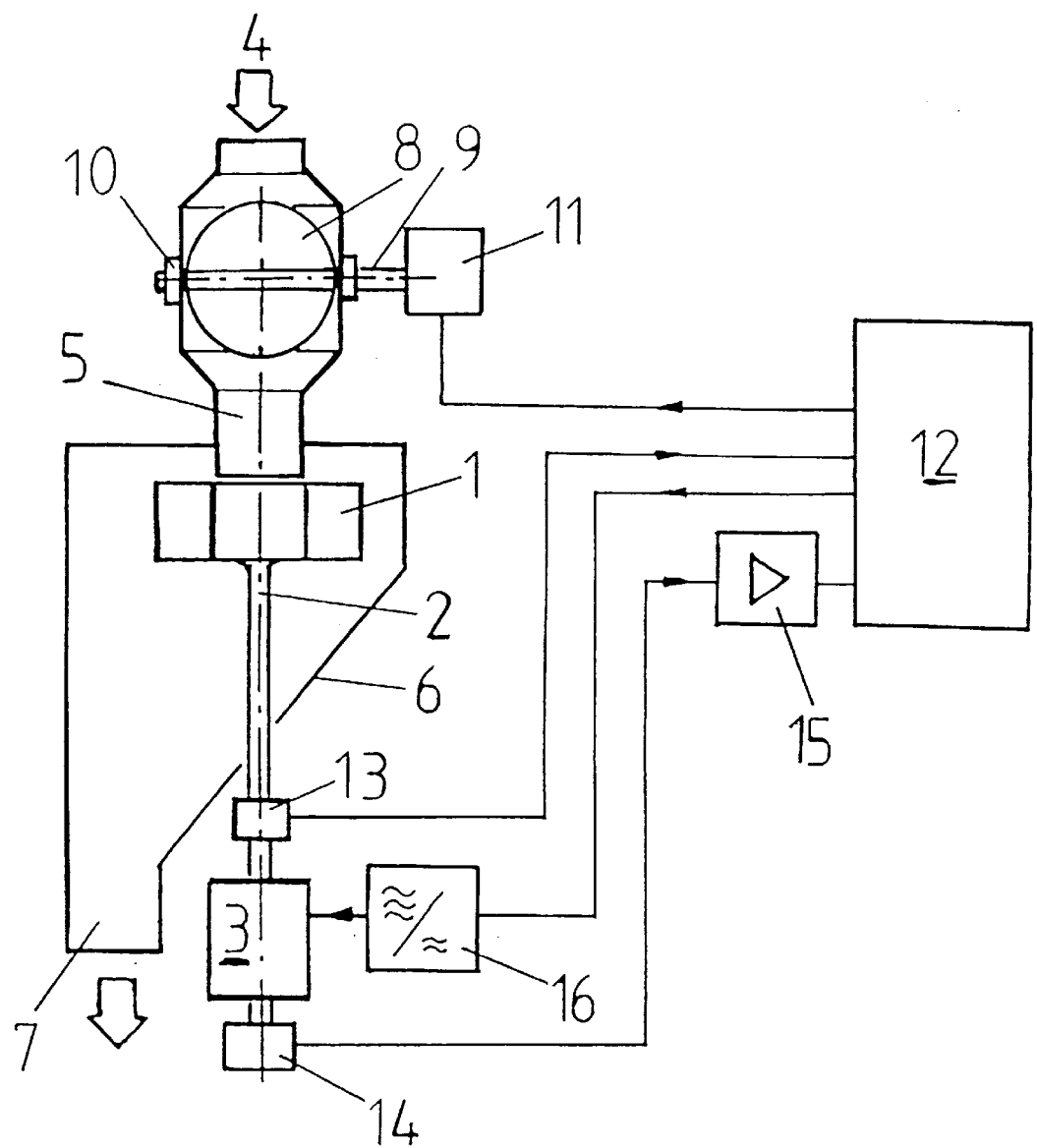
FIG. 1 shows a schematic block diagram of an automatic calibration device according to the invention.

In FIG. 1 is shown an impeller 1 intended to be a part of a complete device for measuring a mass flow of the kind described in our copending European patent application No. 96850202.1. The other parts relating to the measuring device can have the same, but also alternative, designs as those shown in that previous application. The impeller 1 is mounted for rotation around a vertical rotatable shaft 2, driven by an electric motor 3. The material 4 to be measured is fed to the impeller 1 via an inlet device, ending with an inlet tube 5 closest to the impeller 1, the tube 5 reaching into a housing 6 enclosing the impeller 1. The housing 6 can as shown be formed as a hopper, at the bottom ending with an outlet opening 7 for the material measured.

The inlet device shown comprises a controllable flap valve 8, or another type of quickly movable valve, which can stop the flow of material into the inlet tube 5 and the impeller 1. The flap valve 8 is rotatable by means of a shaft 9, journalled in bearings 10 and its rotation is controlled by a turning device 11. The turning device 11 is in its turn controlled by a control device 12, e.g. a measuring and controlling computer. The turning device can be an electric or hydraulic operated turning device.

To the vertical rotatable shaft 2 a tachometer 13 is attached, for registering the rotation speed of the shaft 2, and transmitting the information to the control device 12. The torque on the electric motor 3 is measured by a torque measuring device 14, connected to a signal processor 15, in which the output signal from the torque measuring device 14 is converted to an input signal to the control device 12, for transmitting a torque input signal to the control device 12. Further, a static frequency changer 16 is connected between the control device 12 and the electric motor 3, so that the control device 12 can control also the rotational speed of the electric motor 3. In the control device 12 there is furthermore included a settable calibration factor as a parameter. Its value is normally set after a material calibration with known flow.

Figure 2:
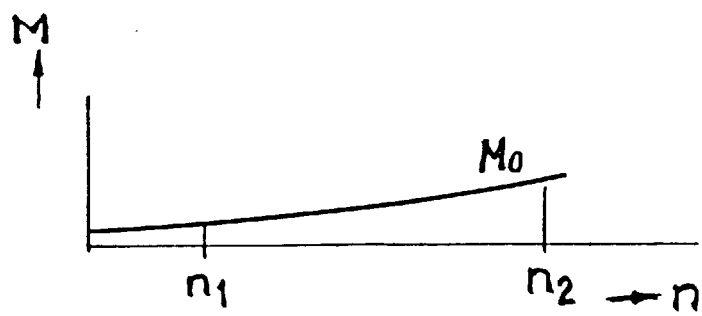
FIG. 2 shows the idling moment arising from friction $M_0$ as a function of the rotational speed.
Figure 3:
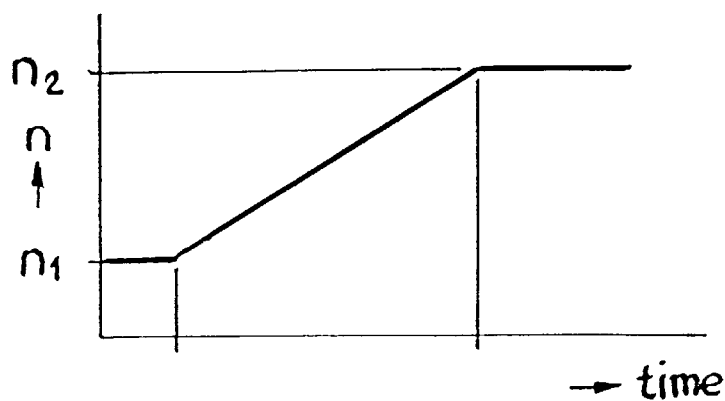
FIG. 3 shows an example of an interval of rotational speed as function of the time.
Figure 4:
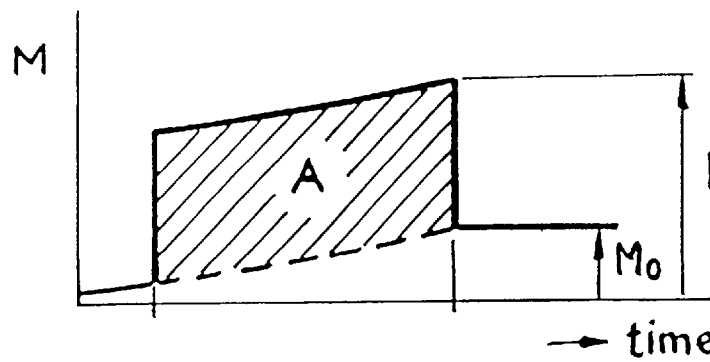
FIG. 4 shows the moment arisen therefrom and its time integral.

FIG. 2 shows the idling moment $M_0$ as a function of the rotational speed n. FIG. 3 shows an example of how the rotational speed can be varied in an interval from a lower rotational speed $n_1$ to a higher rotational speed $n_2$ with a constant increase by time during the interval. FIG. 4 shows the moment depending on the change of rotational speed according to FIG. 3. From showing the moment $M_0$ at the rotational speed $n_1$ according to FIG. 2 the moment increases to $M_J + M_0$ when the rotational speed starts to increase. $M_J$ is proportional to the increase in the rotational speed, dn, and is nonexistent when the rotational speed is constant.

The method according to the invention used in practice is described hereinafter by the help of an example, and divided in different sequences.

The control device is then in this example given a manual command about the calibration activity. Before an automatic calibration check is done it is presupposed that the control device is programmed to memorize the correlation idling values for different rotational speeds is done. The first sequence is carried out when the material flow is absent. Thus, the control device is programmed to change the rotating speed in a number of discrete steps dn from the minimum rotational speed $n_1$ to the maximum $n_2$ and the correlated moment value $M_o$ at every step is saved as a parameter value in the control device 12. When an automatic calibration check sequence thereafter is done, this should primarily be done when the material flow is absent. The control device is programmed to first set the rotational speed to a low value, as shown by $n_1$ in FIG. 3. Thereafter the rotational speed is brought to increase proportionally to time until the rotational speed $n_2$ is reached. According to the previously shown equation, giving the relation between the measured moment M and the change in rotational speed, is evident that if dn/dt is constant as in the present example, the moment indication will be constant and equal to $M_J$ during the time the increase of rotational speed is in progress. The idling moment $M_0$, however, presents an increase during the interval of rotational speed shown in FIG. 2, which also is evident from FIG. 4, showing the moment indication M during the change of rotational speed. The control device is programmed to subtract $M=M_J-M_0$ and to step by step sum up M during the change of rotational speed, whereby the sum will give a value of the kinetic energy A according to the previously shown equation. The kinetic energy A corresponds to the hatched area in FIG. 4.

The measured value of the kinetic energy A is memorized as a parameter which value is compared to the previous calibration check. After verification of the system the appropriate action can be taken, e.g., alarm, if a deviation from the correspondence with the parameter value from a previous calibration check is to hand. If desired, the system can programmed to be automatically recalibrated with the obtained check parameter value as reference, where the value of the calibration parameter value is changed with the same relative magnitude as the deviation at the calibration check.

If the magnitude value of the idling moment $M_0$ is found to be sufficiently reproducible, the first sequence of the calibration check procedure may not be included at every time a calibration check is carried though and if the magnitude of the idling moment $M_o$ is so small that the influence thereof can be omitted, compared to $M_j$, the first sequence of the check can be excluded.

Independently of how the change in rotational speed varies by time it can be shown that the kinetic energy A will have the same value for a given interval of rotational speed. It is not necessary that the flow is absent as long as it is constant during the time for the change of rotational speed and will therefore give a constant acceleration of the material. Thus, an automatic calibration can be done under this condition. Correspondingly a calibration can be done at decreasing change of rotational speed, if regard is paid to the sign.

We claim:

1. A method for providing an automatic calibration check of a measuring device in which particles to be measured are subjected to tangential acceleration in a whirling impeller, and torque exerted on vanes of the impeller in reaction to the Coriolis force of accelerated particles is measured as an indication of mass flow rate of a material containing the particles, the material being fed to a central part of the impeller and thereafter thrown by centrifugal force outwardly towards the outer circumference of the impeller, while using a control device for measuring said flow rate and for governing operation of the measuring device, comprising the steps of:

programming said control device to vary the rotational speed of said impeller within a predetermined range, while flow of said material is absent or proceeding at a constant flow rate;

while varying said rotational speed, measuring the moment change to obtain a corresponding value for the moment of acceleration;

correcting said value for said moment of acceleration, by subtracting a corresponding value for the idling moment, to obtain a corrected value;

integrating said corrected value over a time corresponding to said interval, to obtain an integrated value; and using said integrated value for verifying operation of an instrument system including said measuring device.

2. The method of claim 1, further comprising:

using said integrated value for recalibrating said measuring device.

3. The method of claim 1, further comprising:

automatically detecting that flow of said material is absent, and thereupon performing said automatic calibration check.

4. A method for providing an automatic calibration check of a measuring device in which particles to be measured are subjected to tangential acceleration in a whirling impeller, and torque exerted on vanes of the impeller in reaction to the Coriolis force of accelerated particles is measured as an indication of mass flow rate of a material containing the particles, the material being fed to a central part of the impeller and thereafter thrown by centrifugal force outwardly towards the outer circumference of the impeller, while using a control device for measuring said flow rate and for governing operation of the measuring device, comprising the steps of:

causing a valve to close an inlet flow of said material to said impeller during a time interval corresponding to a predetermined number of revolutions of said impeller, and, upon expiration of said time interval, to open for allowing said material to flow;

programming said control device to vary the rotational speed of said impeller within a predetermined range, while flow of said material is absent or proceeding at a constant flow rate;

while varying said rotational speed, measuring the moment change to obtain a corresponding value for the moment of acceleration;

correcting said value for said moment of acceleration, by subtracting a corresponding value for the idling moment, to obtain a corrected value;

integrating said corrected value over a time corresponding to said interval, to obtain an integrated value; and using said integrated value for verifying operation of an instrument system including said measuring device.

5. The method of claim 4, further comprising:

using said integrated value for recalibrating said measuring device.

6. The method of claim 4, further comprising:

automatically detecting that flow of said material is absent, and thereupon performing said automatic calibration check.

7. The method of claim 4, wherein:

said control device is further arranged for causing said valve, upon being actuated, to close, for interrupting said flow of material to said impeller.

\* \* \* \* \*